United States Patent [19]

Rees

[11] Patent Number: 4,676,347
[45] Date of Patent: Jun. 30, 1987

[54] RAILWAY BRAKE SHOE

[75] Inventor: James G. Rees, Chicago, Ill.

[73] Assignee: James Hardie Brakes Pty. Limited, Smithfield, Australia

[21] Appl. No.: 781,254

[22] Filed: Sep. 27, 1985

[51] Int. Cl.⁴ ............................................. F16D 69/00
[52] U.S. Cl. .............................. 188/250 G; 188/250 B
[58] Field of Search ............ 188/250 G, 250 B, 250 H, 188/250 E, 56, 236, 258, 255, 257, 250 R; 192/107 T

[56] References Cited

U.S. PATENT DOCUMENTS

| 861,556 | 7/1907 | Thompson | 188/250 B |
| 899,454 | 9/1908 | Lockwood et al. | 188/250 B |

FOREIGN PATENT DOCUMENTS

| 0517300 | 10/1955 | Canada | 188/236 |
| 0036551 | 11/1965 | Fed. Rep. of Germany | 188/250 E |

Primary Examiner—Andres Kashnikow
Assistant Examiner—Robert J. Oberleitner
Attorney, Agent, or Firm—Gary, Juettner & Pyle

[57] ABSTRACT

A railway brake shoe adapted to be mounted on a standard brake head and having a wheel engaging surface with portions having a plurality of radii for matching rail wheels of different diameters. The portion having the smallest radius extends along the entire wheel engaging surface such that during braking the relationship between the brake head and shoe is such that the shoe will not vibrate.

9 Claims, 5 Drawing Figures

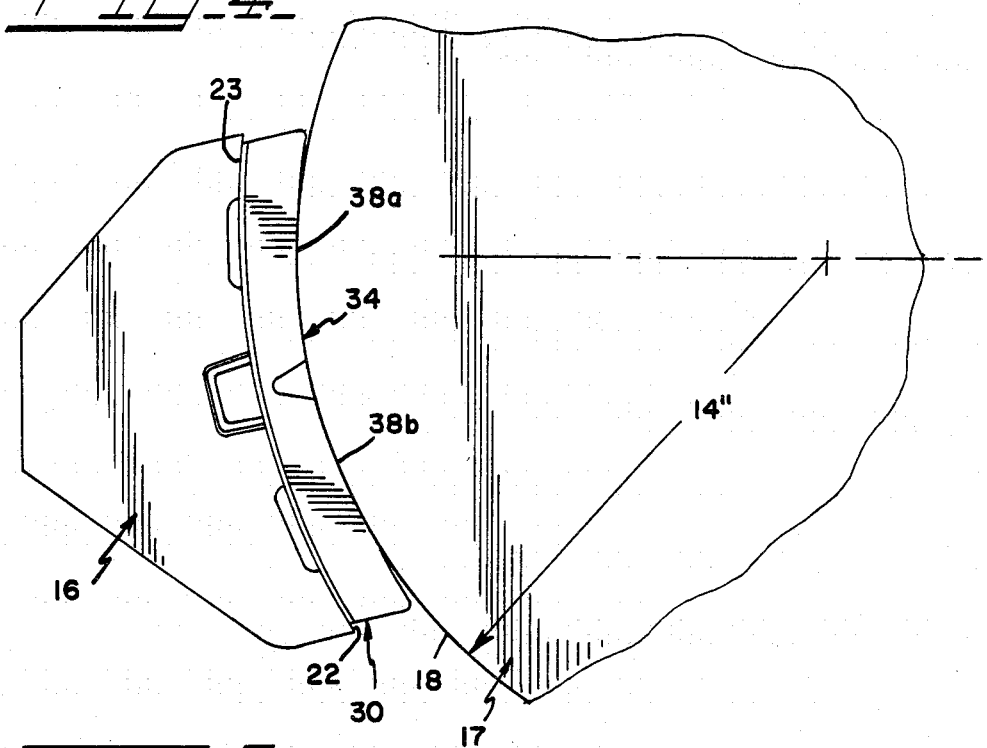
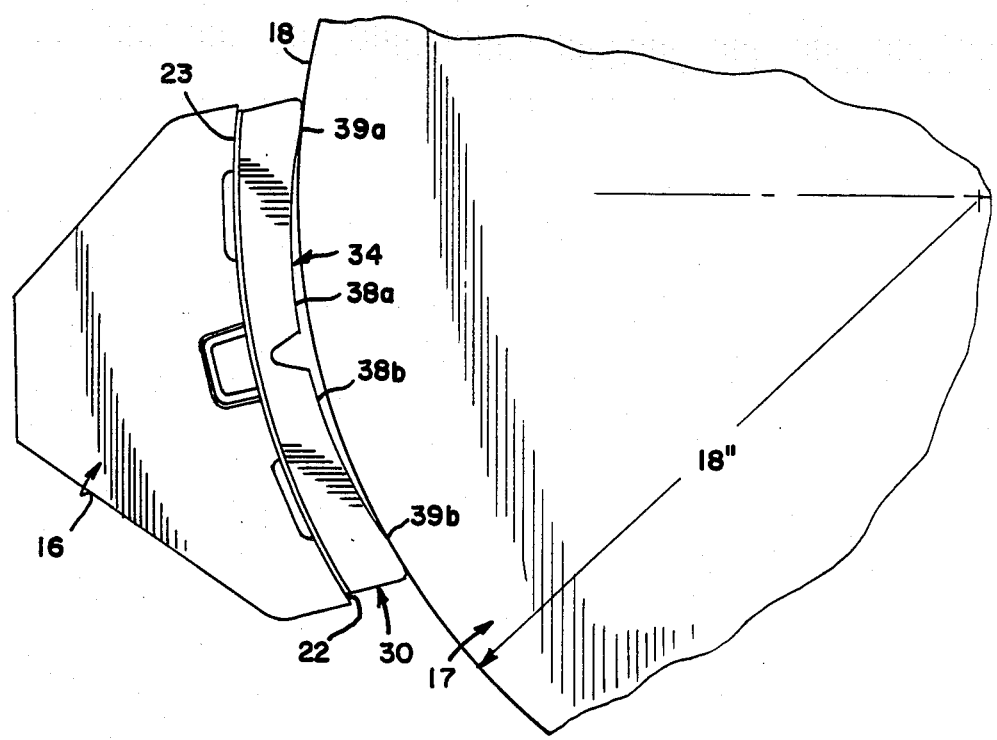

RAILWAY BRAKE SHOE

DESCRIPTION

This invention relates in general to a railway brake shoe for a rail wheel of a railway car, and more particularly to a brake shoe capable of matching rail wheels of different diameters, and still more particularly to a brake shoe having wheel engaging surfaces of different radii.

BACKGROUND OF THE INVENTION

The Association of American Railroads (A.A.R.) has approved several rail wheel diameters for railroad vehicles used in the United States and contiguous countries. Commonly used in freight service are 28-inch, 33-inch and 36-inch diameter wheels, which constitute the nominal diameters of the cylindrical or cylindrical-conical surfaces that contact the rails. These diameters do not relate to the diameter of the flange that guides the wheels along the rails. Moreover, it is well known that these diameters change as a wheel wears following continuous service.

Brakes for railway cars include brake shoes mounted to brake heads wherein the shoes include a wheel engaging surface that engages the cylindrical or cylindrical-conical surfaces of the wheels. Until recently the metal shoes have been cast metal and known as "metallic" shoes. They are now generally of composition material and known as "composition" shoes. These shoes are primarily non-metallic in that they consist largely of non-metallic friction materials bonded together by various types of resinous matrix materials, although sometimes metallic particles are mixed in with the friction materials. A shoe assembly includes a layer of friction material bonded to a metal backing plate. It therefore may be appreciated that both "metallic" and "composition" shoes are used in railway car braking.

The geometric configuration for composition shoes is prescribed by the Association of American Railroads, and per A.A.R. specifications, even though a variety of wheel diameters exist on the railway vehicles in use, the wheel contacting face or surface of the shoes is limited to one basic radius. Likewise, the contour of the brake head which holds the brake shoe is also prescribed by the Association of American Railroads and includes one basic radius for the brake shoe engaging surface.

Because of the requirements for changing brake shoes at any rail yard facility where the railway vehicles might pause, and the desire for standardization to avoid misapplication of incorrect shoes, as above only one standard non-metallic shoe is available and which has a wheel engaging surface radius of 18 inches. While shoes having an assortment of radii would be preferable, the considerations of simplicity of supply and the hazard of misapplication have caused the standardization favoring the 36-inch wheel.

The development of 28-inch wheels for railway cars hauling high cargo such as road trailers and containers has caused problems where the brake shoe for the 36-inch wheel is used because it may prematurely fail. Application of a 36-inch brake shoe mounted on a standard brake head will at first only effect a narrow band of contact with a 28-inch wheel near the center of the shoe during braking. This causes an air gap or an area of non-contact to exist between the brake head and the shoe which generally coincides with the area that is not contacted at the shoe face by the wheel, resulting in causing the shoe to vibrate during braking until the shoe is worn to a radius conforming to the wheel diameter. This may require considerable time, and it has been known that effective reshaping of the shoe face sometimes requries over 20,000 miles of railway car travel. During this reshaping the vibration can cause premature failure of the shoe that has been particularly evident in the modern composition shoe. Such failure is manifested in cracking of the composition material and sometimes separation of large parts of the material from the backing plate. In some cases cracking and fracturing of the backing plate is experienced. It can readily be appreciated that such premature failure is economically wasteful and dangerous.

SUMMARY OF THE INVENTION

The present invention relates to a brake shoe that overcomes the above heretofore problem in that it is capable of being used for multiple diameter railway car wheels and avoiding the premature failure problem. More particularly, the wheel engaging face of the brake shoe of the present invention includes areas of different radii to accommodate various diameter rail wheels such that the brake shoe during brake application will always be in substantially full contact with the brake head to eliminate vibration during brake application.

It is therefore an object of the present invention to provide a new and improved brake shoe for railway cars that may be effectively used for wheels of various diameters.

Another object of the present invention is in the provision of an improved brake shoe capable of being used for railway car wheels of different diameters that avoid premature failure.

A still further object of the present invention is in the provision of a brake shoe having a brake engaging face with areas of different radii.

A further object of the present invention is to provide a brake shoe for use in braking applications of railway wheels of different diameters so that the inventory of one brake shoe size will effectively serve replacement purposes where different diameter wheels are encountered.

Other objects, features and advantages of the invention will be apparent from the following detailed disclosure, taken in conjunction with the accompanying sheets of drawings, wherein like reference numerals refer to like parts, in which:

BRIEF DESCRIPTION OF THE DRAWINGS

FIG. 4 is an enlarged view but similar to FIG. 3, except it shows the brake shoe of the present invention with plural radii on the braking surface, and illustrates the full engagement of the brake shoe with the brake head during braking when used for a wheel of the same diameter as in FIG. 3;

FIG. 5 is a view similar to FIG. 4 and illustrating the invention when applied to a wheel of larger diameter than that in FIG. 4.

DESCRIPTION OF THE INVENTION

Figure 1:
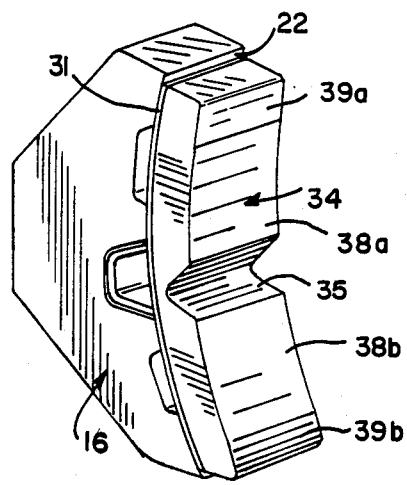
FIG. 1 is a perspective view of a brake shoe embodiment of the present invention in mounted position on a brake head.
Figure 2:
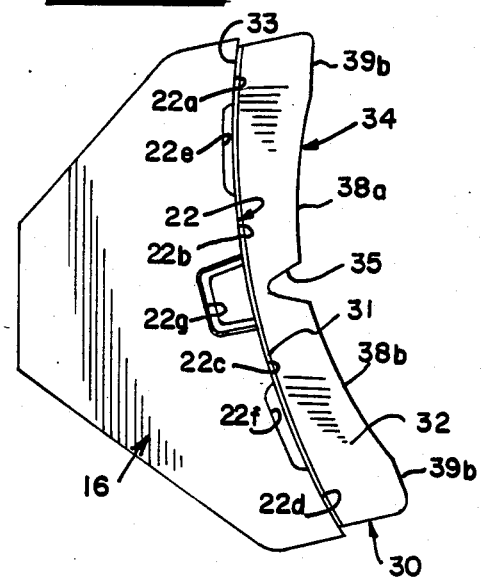
FIG. 2 is a side elevational view of the brake shoe and brake head shown in FIG. 1.
Figure 3:
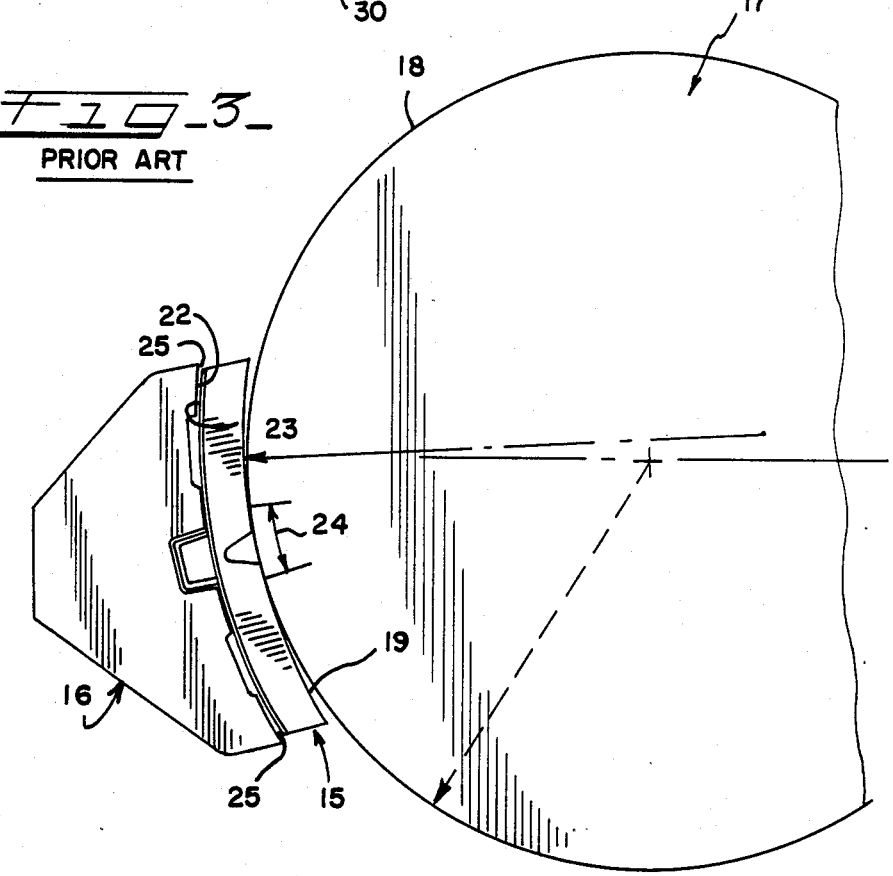
FIG. 3 is a side elevational view of the prior art brake shoe having a single wheel engaging face radius larger than what would match the wheel diameter, and illustrating the gaps between the brake head and shoe in the areas of nonengagement between the wheel and shoe.

Referring now to the drawings, and particularly to FIG. 3, a prior art brake shoe 15 is shown mounted on a brake head 16 and in engagement with a railway wheel 17 having a rail and brake engaging surface or face 18. For purposes of simplicity, the wheel 17 is shown without a flange as it is only necessary to consider the relationship between the rail engaging surface or face 18 of the wheel and the wheel engaging face or surface of the brake shoe to explain the present invention. The wheel engaging surface may also be called the braking surface.

The brake head 16 includes a brake shoe engaging surface or face 22 consisting of a plurality of lands 22a, 22b, 22c, 22d between which are relief areas 22e and 22f and a socket 22g. When made according to A.A.R. specifications, the outer lands have a slightly larger radius than the inner lands, but they are shown to be the same for purposes of simplicity in explaining the invention, which does not depend on the differential in land size. The back surface 23 of the brake shoe 15 is sized to readily mate with and engage the surface 22 during braking provided there is sufficient braking surface contact with the wheel. However, the radius of the back surface may not be identical to the radii of the lands. Therefore, the radius of the back surface is substantially equal to the radius of the brake head engaging surface. The diameter of the wheel 17 is less than the diameter of a wheel that would match the radius of the brake face 19 of the brake shoe when the shoe is unworn. For example, the normal nominal radius of a braking face is 18 inches and therefore designed to mate with a 36-inch diameter wheel. Thus, where a 28-inch diameter wheel is encountered, the 18-inch radius brake shoe when new will only have a narrow band of engagement with the wheel during braking approximating that indicated by the arrow 24. The contact between the brake shoe engaging face 23 of the brake shoe and the brake shoe engaging face 22 of the brake head is initially caused by the anchoring of the shoe to the head. Additional contact force results from braking and the contact between the wheel and the brake shoe. Gaps 25 between the brake head and the brake shoe along those areas opposite to the non-contact areas between the braking face of the brake shoe and the wheel result, leaving the portions of the shoe in these areas free to vibrate. Thus, during braking applications the outer ends of the brake shoe and the braking plate will vibrate, often resulting in premature failure.

It is not until the braking surface of the brake shoe is worn so that it has sufficient contact along its length with the wheel that vibration is eliminated because of the forcing of the brake shoe against the brake shoe engaging face of the brake head.

The brake shoe of the present invention avoids the vibration problem in having braking surfaces of multiple radii so that during braking operations whether used on a car with, as an example, a 28-inch wheel or a 36-inch wheel, the brake shoe will be in substantially full contact with the brake shoe engaging face of the brake head from the time that a new brake shoe is first installed and until it is worn in. Therefore, a single brake shoe configuration can be effectively used for cars having different wheel diameters and avoid premature failure that is wasteful and sometimes dangerous.

Referring particularly to FIGS. 1, 2, 4 and 5, where the invention is illustrated, the brake shoe of the invention generally designated by the numeral 30 includes the usual backing plate 31 and the friction or braking material layer 32 suitably secured to the backing plate, thus forming a composition shoe as above referred to. Conventional bonding procedures are used to secure the material to the plate. It will be appreciated that the entire shoe may be entirely of metal without departing from the present invention, although the present invention is primarily concerned with composition shoes. The backing plate includes a brake head engaging face or surface 33 illustrated in engagement with the brake head shoe engaging face 22 and a braking surface or face or wheel engaging surface 34. The braking face 34 includes a notch 35 intermediate the ends which is optional, a first braking surface or wheel engaging surface of one radius illustrated as segments 38a and 38b and sometimes hereafter referred to collectively as 38, and a second braking surface of a different radius including segments 39a and 39b and sometimes collectively referred to hereafter as 39. The radius of braking face 39 is larger than that of braking face 38 and, accordingly, braking face 39 will mate with a rail wheel of a larger diameter than braking face 38 as illustrated particularly in FIGS. 4 and 5.

Whether the brake shoe 30 is used on a railway car having 28-inch or 36-inch wheels, the brake head engaging surface of the brake shoe will engage the entire brake shoe engaging surface of the brake head as illustrated in FIGS. 4 and 5, even though a portion of the brake shoe wheel engaging surface will not at first engage the wheel when the brake shoe is new. For 28-inch wheels, the smaller radius being centrally disposed of and extending along the largest portion of the wheel engaging surface of the brake shoe, as shown in FIG. 4, braking will cause the outer ends of the brake head engaging surface of the brake shoe to engage the brake shoe engaging surface of the brake head. In order to accomplish this result, over 50 percent of the entire braking surface of the brake shoe must be contoured with the radius to match the 28-inch wheel. Preferably, the surface on the brake shoe having the smaller radius will be at least 75 percent of the entire braking surface, although it may be appreciated that it can be in the range anywhere from 51 to 80 percent. Similarly, when the brake shoe of the invention is employed new on a car having 36-inch wheels, the braking surface 39 will engage the wheel during braking operations and will cause engagement between the outer ends of the shoe and the brake shoe engaging surface of the brake head, as shown in FIG. 5, thereby avoiding any vibration of the brake shoe during braking applications. Quite obviously, in either case after the braking surface 39 has worn sufficiently, it will cause recontouring of the braking surface so that the entire braking surface will contact the wheel.

While the brake shoe of the invention is shown having a braking surface with portions having only two different radii, it may be appreciated that it may be formed with portions having more than two radii.

In view of the foregoing, it is seen that the brake shoe of the invention having a braking surface with portions of multiple radii provides a brake shoe of standardized construction that can be used for railway cars having wheels of multiple diameters, while at the same time avoiding the heretofore known premature failure problems.

It will be understood that modifications and variations may be effected without departing from the scope of the novel concepts of the present invention, but it is understood that this application is to be limited only by the scope of the appended claims.

The invention is hereby claimed as follows:

1. A railway brake shoe assembly for engagement with a railway wheel comprising a brake head having a brake shoe engaging surface of a given radius, and a composition brake shoe comprising a brake head engaging portion and a wheel engaging surface, the brake head engaging portion having substantially the same radius as the brake shoe engaging surface of the brake head, the wheel engaging surface having first and second wheel engaging surfaces, the second wheel engaging surface having a radius substantially equal to that of the brake head engaging surface, the first wheel engaging surface having a smaller radius than that of the second wheel engaging surface, whereby the brake shoe will properly fit the brake head during braking engagement with wheels having diameters corresponding to the radius of either wheel engaging surface.

2. The railway brake shoe of claim 1, wherein the first wheel engaging surface is substantially greater than said first wheel-engaging surface.

3. The railway brake shoe of claim 2, wherein the first wheel engaging surface is centrally disposed on the entire wheel-engaging surface.

4. The railway brake shoe of claim 1, wherein the first wheel engaging surface covers more than half of the entire wheel engaging surface.

5. The railway brake shoe of claim 1, wherein the first wheel engaging surface covers at least 75 percent of the entire wheel engaging surface.

6. The railway brake shoe of claim 1, wherein the first wheel engaging surface covers in the range of 51 to 80 percent of the entire wheel engaging surface.

7. The railway brake shoe of claim 1, wherein the first wheel engaging surface covers a sufficient portion of the entire wheel engaging surface to cause the brake head engaging surface to contact substantially all the brake shoe engaging surface of the brake head during braking applications and eliminate the damaging effect of vibration.

8. A railway brake shoe assembly comprising the combination of a brake head for supporting a brake shoe, said brake head having a curved brake shoe engaging surface, a composition brake shoe comprising a layer of friction material bonded to a curved backing plate, said backing plate having a radius of curvature substantially equal to the radius of the brake shoe engaging surface of the brake head, and a wheel engaging surface on the friction material for engaging a wheel of a given diameter, said wheel engaging surface comprising a central curved portion having a first radius corresponding to a wheel of a first diameter and a pair of outer curved portions having a second radius larger than said first radius and corresponding to a wheel of a second diameter, said central portion being sufficiently large to cause said backing plate to be in full contact with the bake shoe engaging surface during frictional engagement between said wheel and said central portion, thereby preventing vibration of the ends of the brake shoe.

9. The railway brake shoe assembly of claim 8 wherein said second radius of the outer curved portions is substantially equal to the radius of curvature of said backing plate.

* * * * *